Dec. 11, 1951 C. R. MERRILL 2,578,195
RIDGE OR STEP GRINDER FOR INTERNAL-COMBUSTION ENGINES
Filed Feb. 1, 1946 6 Sheets-Sheet 1

Cy Raymond Merrill INVENTOR.

Dec. 11, 1951  C. R. MERRILL  2,578,195
RIDGE OR STEP GRINDER FOR INTERNAL-COMBUSTION ENGINES
Filed Feb. 1, 1946  6 Sheets-Sheet 2
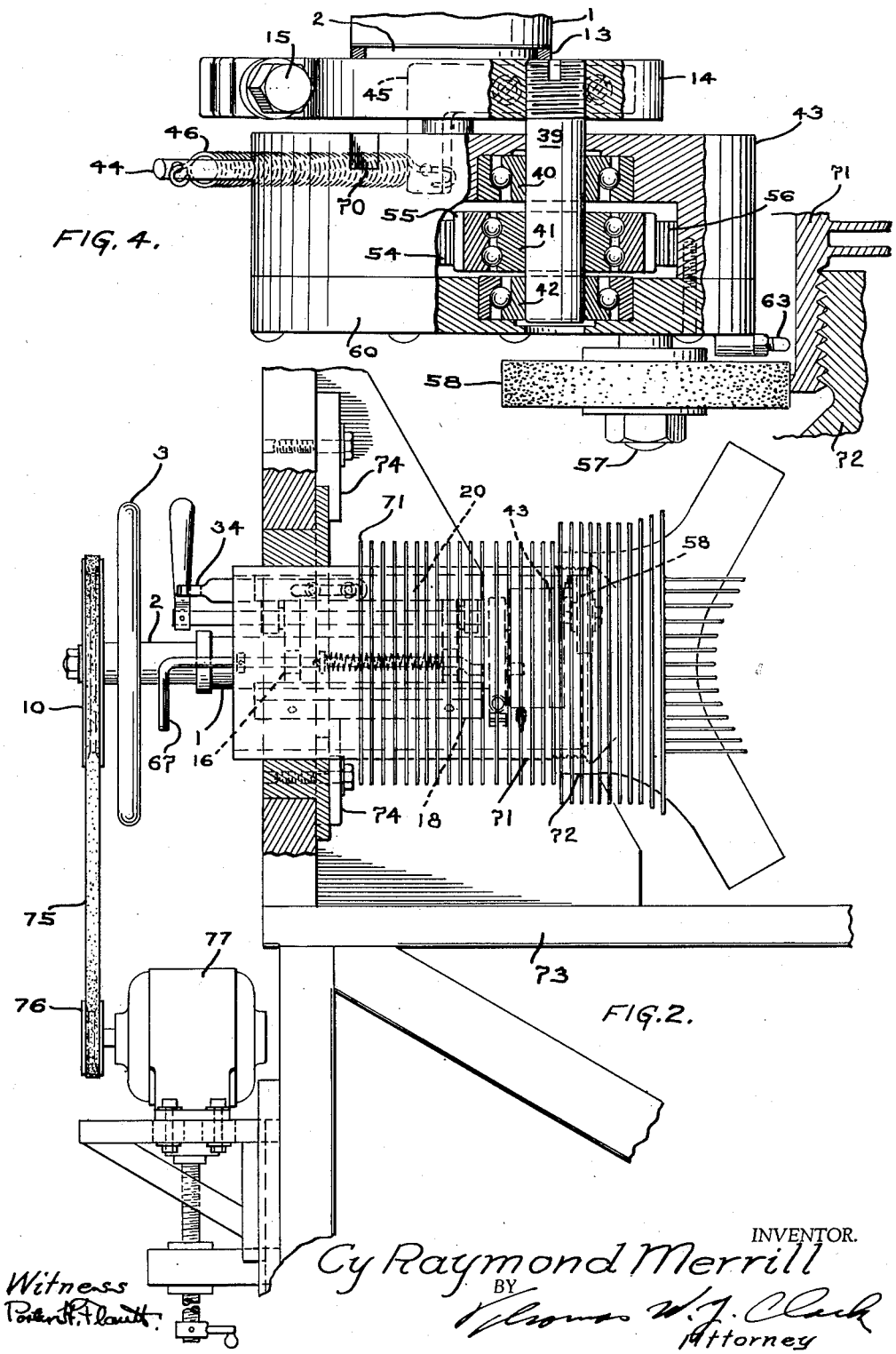

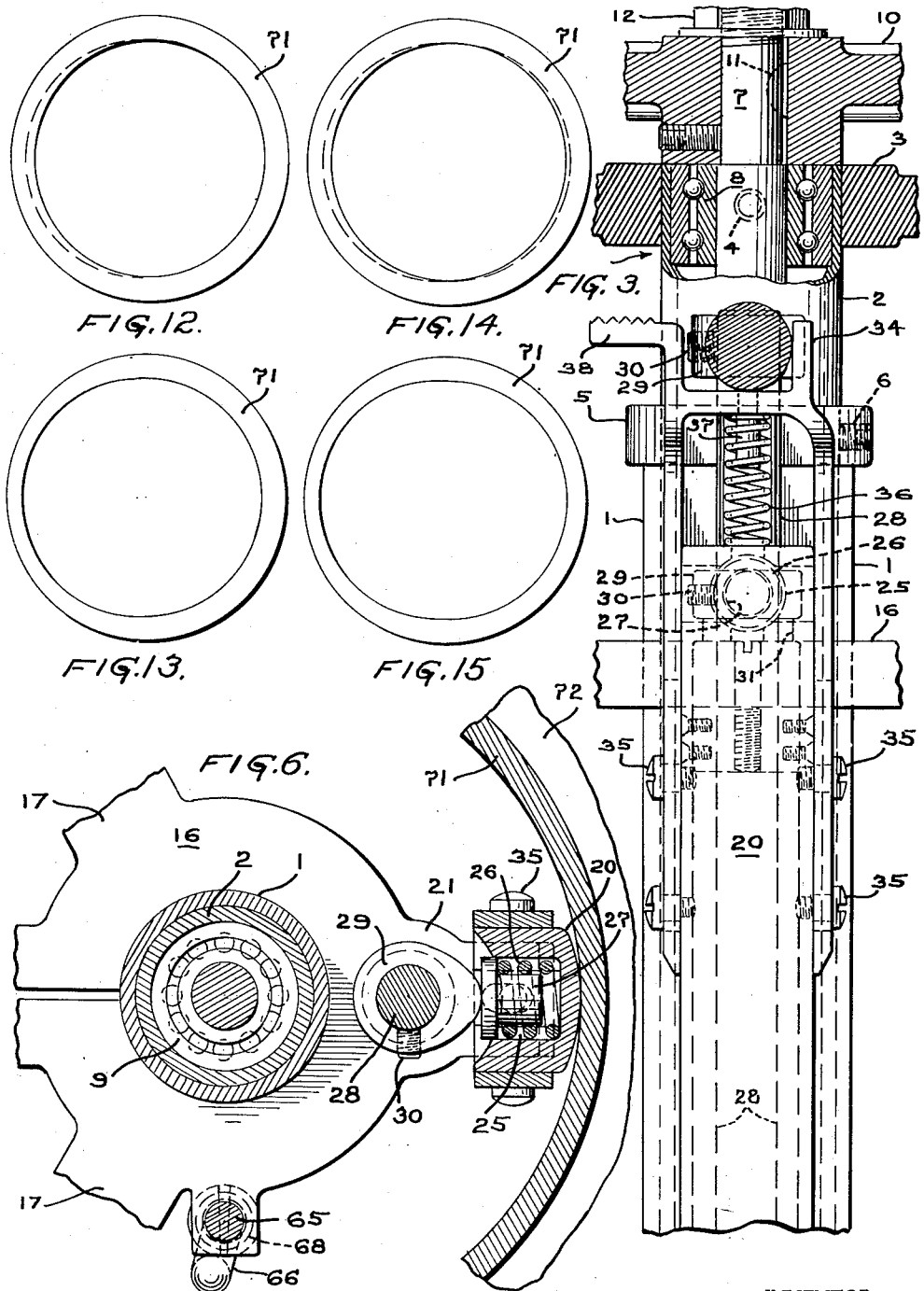

Dec. 11, 1951              C. R. MERRILL             2,578,195

RIDGE OR STEP GRINDER FOR INTERNAL-COMBUSTION ENGINES

Filed Feb. 1, 1946                                6 Sheets-Sheet 4

INVENTOR.
Cy Raymond Merrill
BY
Thomas W. Clark
Attorney

Witness
Porter H. Hauth

Dec. 11, 1951   C. R. MERRILL   2,578,195
RIDGE OR STEP GRINDER FOR INTERNAL-COMBUSTION ENGINES
Filed Feb. 1, 1946   6 Sheets-Sheet 5

INVENTOR.
Cy Raymond Merrill
BY
Thomas W. J. Clark
Attorney.

Witness
Porter H. Clark

Dec. 11, 1951  C. R. MERRILL  2,578,195
RIDGE OR STEP GRINDER FOR INTERNAL-COMBUSTION ENGINES
Filed Feb. 1, 1946  6 Sheets-Sheet 6
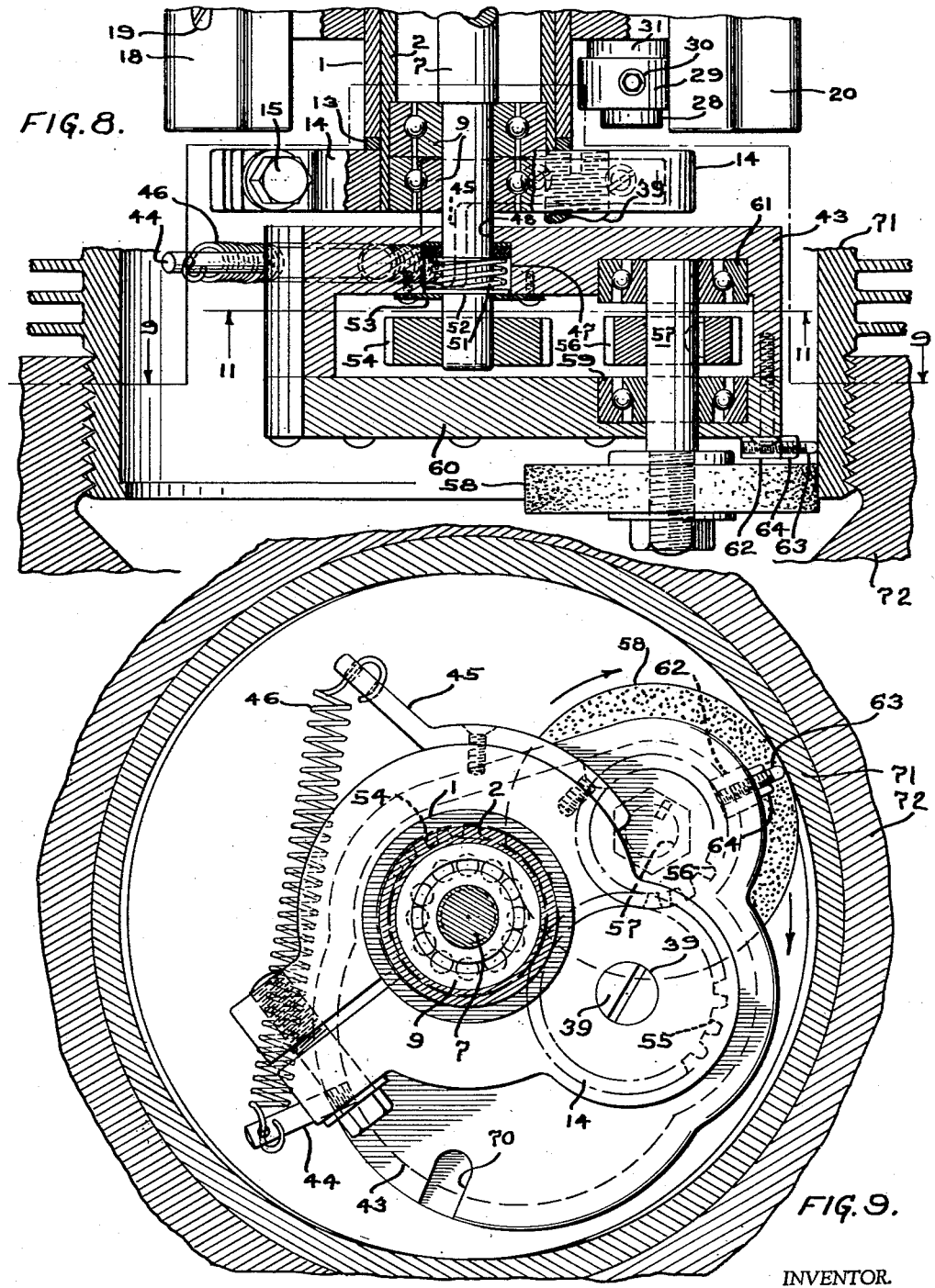
INVENTOR.
Cy Raymond Merrill
BY
Thomas W. J. Clark
Attorney
Witness
Porter H. Hewitt

UNITED STATES PATENT OFFICE 2,578,195

RIDGE OR STEP GRINDER FOR INTERNAL-COMBUSTION ENGINES

Cy Raymond Merrill, Towson, Md., assignor to The Black & Decker Manufacturing Company, a corporation of Maryland Application February 1, 1946, Serial No. 644,908

17 Claims. (Cl. 51—245)

This invention relates to a grinding machine for grinding or removing a step or ridge or shoulder that occurs in the cylinder of an engine at the end of the piston ring travel.

Piston rings in aircraft and automobile engines, as well as others, tend to wear the cylinder in an irregular manner, sometimes cutting the wall only on one side and sometimes cutting the wall evenly on opposed sides, forming an oval. Generally at the end of the piston ring travel a ridge is left on the end of the cylinder and this ridge or shoulder has the interior shape of the unworn cylinder. When the engine is taken down to put in new piston rings, the new rings would strike against this ridge or shoulder and sometimes break the ring or cause other injury or difficulty in the smooth operation of the engine. It is therefore necessary to remove this ridge or shoulder in order to let the piston travel throughout the length of the cylinder on the same path that the worn cylinder presents to the new piston ring through the body of the cylinder. In removing this ridge or shoulder it is important that the cylinder inner wall should not be injured. Although it has been the practice to grind cylinders throughout their length to a larger diameter where the cylinder blocks are made of comparatively soft metal this practice has not been practicable for cylinders made of very hard metal or where the cylinders are quite thin originally and it becomes necessary to conserve the metal in the cylinder for the strength required. In these latter cases the inner wall of the cylinder is left with its wall deformed as worn by the piston rings and the ridge or shoulder formed at the end of their travel has been removed either by cutting or grinding.

Many of the aircraft cylinders are now made of very hard material such as chrome molybdenum and Nitralloy. These hard metals must be ground to form the continuous surface required on the interior of the cylinder. Although efforts have been made to grind the step or ridge from these cylinders by hand held machines, these hand held machines are most difficult to guide to leave a continuous surface, in line with the worn surface, of the cylinder, and it has therefore become necessary to support the grinding machine firmly and to guide the grinding wheel accurately to produce a continuous surface on the interior of the cylinder where the ridge had been formed.

The object of this invention is to produce a grinding machine in which the grinding wheel is mechanically and accurately guided to grind the step or ridge formed in the cylinder and to make this surface continuous with the worn portion of the cylinder adjacent thereto.

The grinding machine of this invention is placed in the cylinder and then resiliently but firmly locked in place axially of the cylinder, the grinding wheel having previously been withdrawn toward the center of the machine to prevent scarring of the wall of the cylinder. Prior to placing the machine in the cylinder the gauge of the machine is accurately adjusted to the face of the grinding wheel which has also previously been dressed to present a true grinding edge parallel with the machine axis. After the machine is thus locked in the cylinder, in axial position, the support immediately holding the grinding wheel is released and it is resiliently urged against the ridge or step which is to be removed. This support is then manually slowly turned around the inner circumference of the cylinder and the gauge prevents grinding where there is no ridge and allows the grinding of the ridge to take place at all other portions. The grinding wheel support is then turned around the machine axis until the grinding ceases and it will then be found that where the ridge was formerly, the surface of the cylinder is completely in line with the immediately adjacent portion of the cylinder body and if the cylinder has formerly been worn oval in any portion of its circumference, this oval formation is now present where the ridge or step formerly was.

After grinding the ridge or step from the cylinder in the above manner new rings may be placed in the cylinder and the operation and tightness of the piston in the cylinder will be restored for the proper efficiency of the motor.

Other objects and advantages of the invention will be apparent from the following description and accompanying drawings forming a part hereof and in which:

Figure 2 is a horizontal elevation of a cylinder mounted in a jig being ground by the machine of this invention.

Figure 3 is a vertical elevation, partly in section and with parts partly broken away, of the upper part of the machine.

Figure 4 is a similar view of the lower part of the machine.

Figure 6 is an end view partly broken away showing the clamping shoe.

Figure 8 is a vertical sectional view of the lower part of the machine.

Figure 9 is a cross-sectional view on line 9—9 of Figure 8.

Figure 12 is a top plan view of a cylinder before grinding.

Figure 13 is a similar view of the same cylinder after grinding.

Figure 14 is a similar view of a cylinder with a different shaped shoulder or step.

Figure 15 is a similar view of the cylinder of Figure 14 after grinding.

Similar numerals refer to similar parts throughout the several views.

Figure 1:
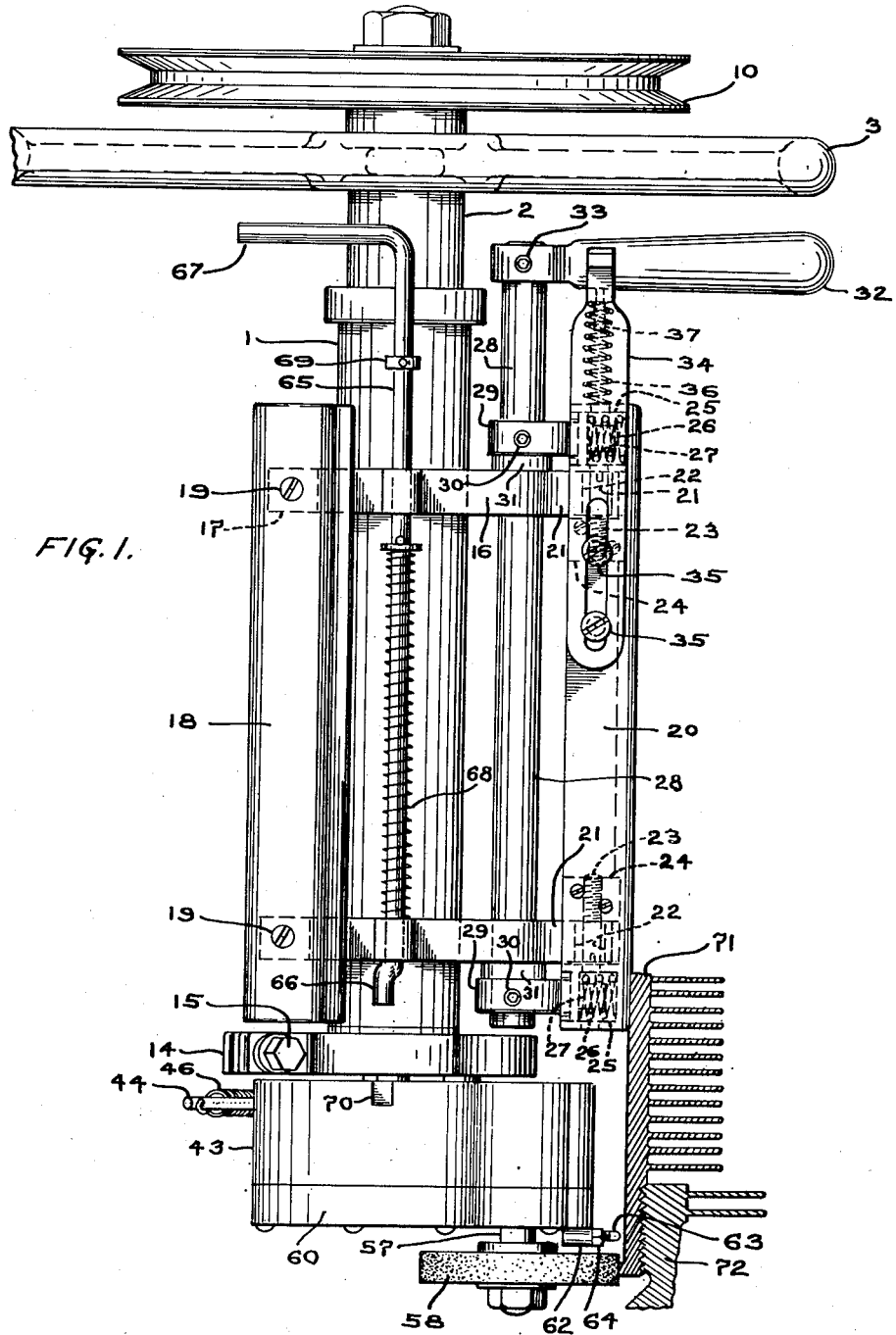
Figure 1 is a vertical elevation of the machine of this invention.

The machine has an outer sleeve or housing 1 rotatably mounted within which is an inner sleeve 2 on which hand wheel 3 is firmly secured by set screw 4. Upward movement of sleeve 1 on sleeve 2 is prevented by collar 5 fixedly mounted on sleeve 2 by set screw 6. Shaft 7 rotates in sleeve 2 on ball bearing races 8 and 9. This shaft is driven from pulley 10 keyed at 11 and bolted at 12 to its upper end. The inner races of bearings 8 and 9 fit with a press fit on shaft 7 and the outer races fit with a press fit in sleeve 2. A collar 13 extends from the bottom of sleeve 1 to close the space between the sleeve 1 and bracket 14 rigidly held on the end of sleeve 2 by bolt 15.

Sleeve 1 has rigidly clamped thereon two similar brackets or spiders 16. These brackets have radially extending prongs 17 which have mounted thereon shoes 18 by means of screws 19, the shoes extend parallel to the axis of the machine and are spaced substantially 120° apart at their centers. Likewise about 120° from each of these shoes is a clamping shoe 20 mounted on a third prong 21 of each of the brackets 16. This prong 21 has therein a slot 22 in which screws 23 move radially. Screws 23 are fast in blocks 24 screwed to the shoe 20. This mounting allows for a radial movement of shoe 20 on each of the brackets 16 and the movement on one bracket is independent of that on the other. Shoe 20 has likewise in each end a socket 25 for a compression spring 26 in which is mounted a plug 27. The prongs 21 of the brackets 16 have passing through aligned holes therein shaft 28 which has cams 29 fixed thereon by set screws 30. Collars 31 space the cams from the brackets 16 and thus hold shaft 28 in position. These cams ride upon plugs 27. The shaft 28 is turned by means of handle 32 non-rotatably fixed thereon by set screw 33. Handle 32 can be held with the cams in outwardly extending position by means of yoke 34 slidably mounted on screws 35 in shoe 20. The yoke is held extended by spring 36 held in the top of the yoke by pin 37, the other end of the spring resting on top of shoe 20. The yoke may be pushed down to release the handle 32 by extension 38.

The holding shoes thus far described allow the machine to be placed axially in the cylinder and the two shoes 18 rest upon the inner wall of the cylinder and if there is a lengthwise slope to the inner wall of the cylinder, shoe 20 because of the springs 26 therein, will firmly hold the machine in the cylinder by firmly contacting the sloping wall of the cylinder. It will be apparent that for larger cylinders additional shoes may be placed on the shoes shown to give a greater supporting spread to the machine.

Bracket 14 has screwed therein a pivot shaft 39 which has the inner races of bearings 40, 41 and 42 thereon fitted with a press fit. The outer race of bearing 40 fits with a similar fit in housing 43 which may be oscillated around shaft 39. Housing 43 has therein a pin 44 and bracket 14 has thereon a downwardly projecting L-shaped bracket 45, and between the bracket 45 and pin 44 spring 46 extends and tends to pull housing 43 clockwise.

Figure 11:
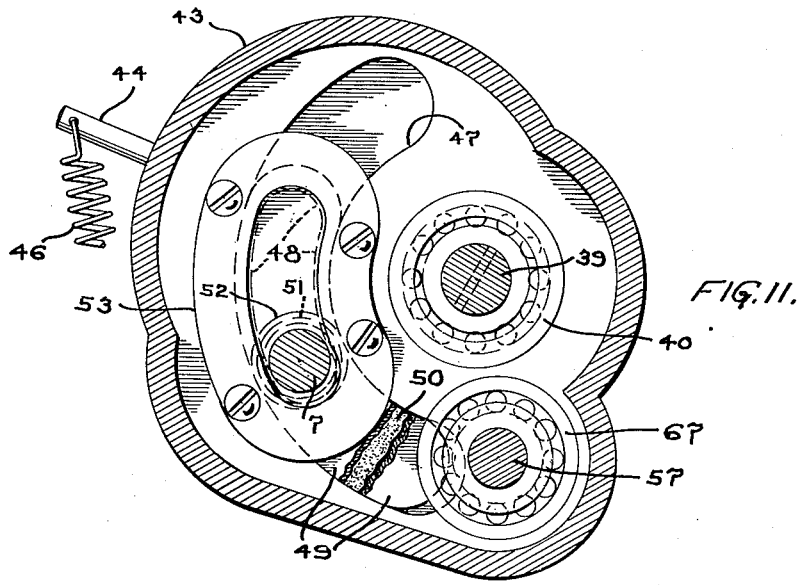
Figure 11 is a sectional view on line 11—11 of Figure 8 looking in the direction of the arrows.

As best shown in Figure 11 the inside of the top of housing 43 has an arcuate slot 47 countersunk therein concentric with shaft 39. Toward the center this slot is cut through the upper plate of the housing 43 as shown at 48. Shaft 7 extends through this slot 48. Two bronze plates 49 with a felt pad 50 therebetween, with openings therethrough at their center for shaft 7 slide in the countersunk arc 47 and are held in place by spring 51, washer 52 and retaining plate 53 to maintain an oil tight opening in the housing 43 for shaft 7.

On the lower end of shaft 7, placed with a press fit is a pinion or small gear 54. This pinion in turn drives gear 55 rotating on bearing 41 on shaft 39, and gear 55 in turn drives gear 56 keyed to shaft 57 on which is mounted the grinding wheel 58. The outer races of bearing 42 and of bearing 59 for shaft 57 are mounted in the bottom plate 60 of the housing 43. The upper bearing 61 for shaft 57 is mounted in the top inner side of the housing 43. Housing 43 is tight and is oil packed.

On the bottom of housing 43 is a lug 62 having a gauge 63 adjustably mounted therein and which may be fixed in its adjustment by nut 64. This gauge 63 is mounted on the housing 43 radially of the grinding wheel 58. The housing 43 being pulled by spring 46 tends to rotate the housing clockwise as shown in Figure 9.

A rod 65 is mounted in the brackets 16 and it has an offset lower end 66 and a handle 67 and is held upward by spring 68 and is limited in its movement by the offset portion 66 and fixed collar 69 thereon. Housing 43 has a slot or opening 70 therein in which the offset portion 66 may be placed, and turning the handle 67 outwardly will then turn the housing 43 counterclockwise to draw the grinding wheel 58 radially of the machine towards its center.

A cylinder of an aircraft engine 71 with the head 72 still on the cylinder is removed from the engine and placed in a jig 73 and firmly clamped therein by clamps 74. After withdrawing the grinding wheel 58 radially of the machine the machine is placed in the cylinder horizontally as shown in Figure 2 and the shoe 20 locked in place by yoke 34. A belt 75 is then placed around pulley 10 and pulley 76 of a motor 77 which may be adjusted in its position on its mounting either sidewise or vertically and the grinding wheel is then released against the shoulder to be ground and by means of the hand wheel 3 the housing 43 is slowly rotated in the inner wall of the cylinder, the gauge 63 having previously been set in the exact grinding line of the face of the grinding wheel 58, the outermost extremity of the gauge being axially in line with the outermost grinding surface of the grinding wheel, that is, the grinding line of the grinding wheel as it extends outwardly from the wheel housing. If the cylinder is in a horizontal position as shown in Figure 2, the gauge tip and the grinding line lie on the same horizontal line extending axially of the cylinder. The rotating of the hand wheel 3 is continued as long as any grinding takes place and then the tool is removed from the cylinder and a perfectly smooth and continuous wall is presented without any ridge or shoulder as shown in Figure 8. The wheel rotates clockwise toward the direction of pull on the housing 43.

In Figures 12 and 14 are shown two forms which the shoulders or steps may take and in Figures 13 and 15 are shown the cylinders after the removal of these steps.

Figure 5:
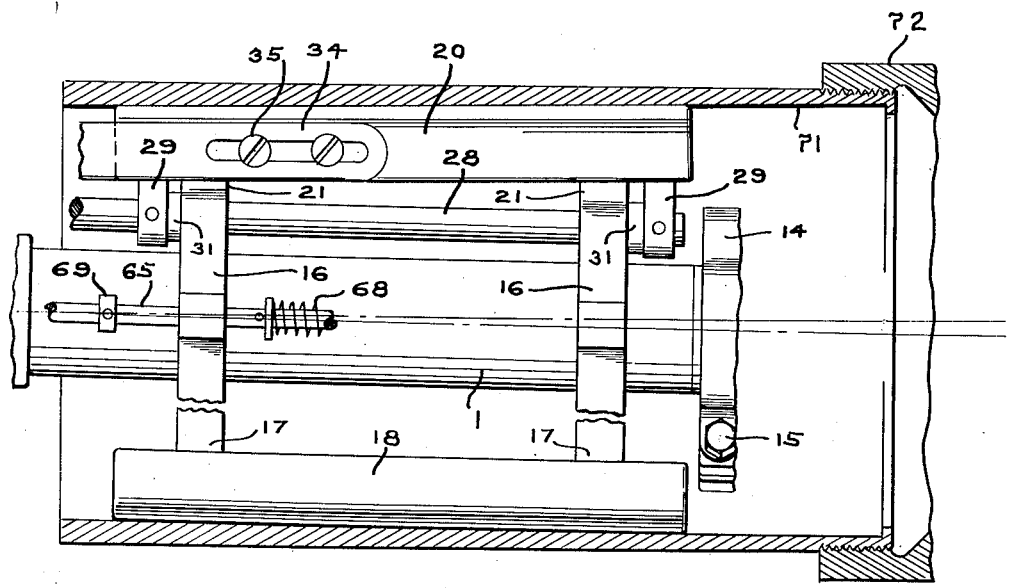
Figure 5 is a horizontal elevational view of the machine showing its mounting in a cylinder.
Figure 10:
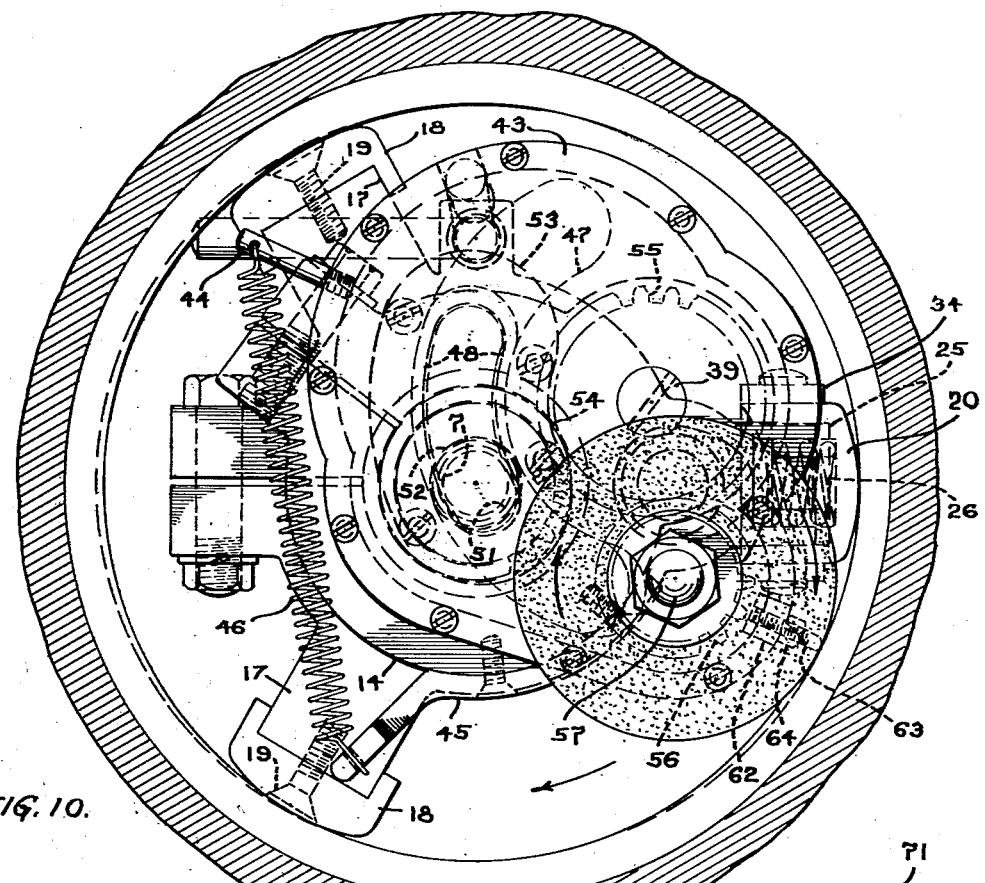
Figure 10 is an inverted plan view of the lower part of the grinding assembly substantially on line 10—10 of Figure 7.
Figure 7:
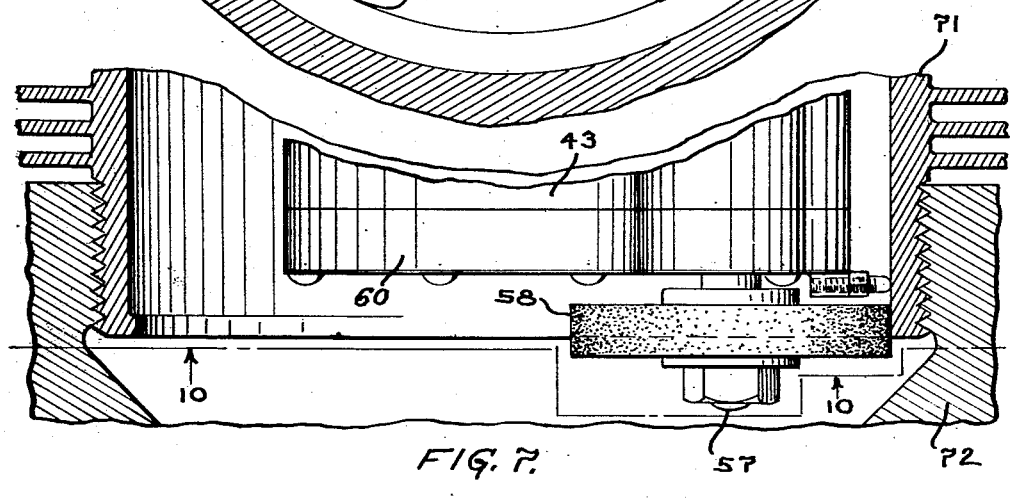
Figure 7 is a vertical front elevation of the lower part of the machine.

Should the cylinder be worn unevenly from end to end as shown in Figure 5, grinding the step out is not practicable except within certain limits of divergence of the axis of the clamped machine and the axis of the cylinder. In Figure 5 the amount of disalignment is shown greatly exaggerated. It will be apparent however that the lack of trueness of the center of the machine from the center of the cylinder being strictly limited, the amount that the axis of the grinding wheel 58 would be out of parallel with the axis of the machine in any one case would be negligible because the gauge 63 is placed close to the grinding wheel, so that virtually a straight line is made by the grinding wheel in every case with the worn inside wall of the cylinder. Cylinders which are worn to an unsafe extent are replaced.

It will be apparent that when additional shoes need to be placed over the shoes 18 and 20 to adapt the machine for a larger cylinder that likewise a larger grinding wheel will be placed on the shaft 57 to fit the machine to grind the enlarged cylinder.

It will be apparent also that many modifications and changes may be made in the structure and design of the machine above described without departing from the invention.

What is claimed as new and is desired to be secured by Letters Patent is:

1. An inner cylindrical surface grinder comprising a tubular housing adapted to project within a cylindrical surface to be ground, a tube concentric with and rotatable in said housing and projecting from both ends thereof, a driven shaft extending axially in said tube, a bracket attached to said tube and extending outwardly therefrom beneath and abutting said housing, a rotary grinding wheel housing pivoted on said bracket on an axis parallel with said shaft to swing bodily on the outside of said tube to move bodily outwardly from the tubular housing, a rotary grinding wheel mounted in said grinding wheel housing, driving connections between said grinding wheel and said shaft, means carried by said tubular housing to mount said tubular housing within a cylindrical surface to be ground with the grinding wheel axis parallel with respect to the cylindrical surface, a collar fixedly attached to the tube above and abutting the tubular housing cooperating with the bracket to prevent relative longitudinal movement between the tube and tubular housing in both directions, means connected to said bracket and grinding wheel housing to move said grinding wheel outwardly from said tubular housing into contact with the cylindrical surface and a wheel attached to said tube at the end opposite said grinding wheel and above the collar to bodily move the grinding wheel around the surface.

2. An inner cylindrical surface grinder comprising a tubular housing, a tube concentric with and rotatable therein, a wheel housing pivoted on an axis parallel to the tube to swing bodily on the outside of said tube outwardly from the tubular housing, said wheel housing having a rotary grinding wheel mounted thereon, the periphery of the wheel extending beyond the wheel housing on one side thereof, means carried by said tubular housing and connected with said wheel to drive said wheel, means carried by said tubular housing to mount said tubular housing with the grinding wheel axis parallel with respect to a cylindrical surface to be ground, means fixedly attached to the tube coacting with the tubular housing to prevent relative longitudinal movement between the tube and tubular housing in both directions, means connected to said tube and wheel housing to urge said grinding wheel outwardly from said tubular housing into contact with said cylindrical surface and a gauge spaced axially from the wheel on said wheel housing in the area where the wheel projects beyond the wheel housing projecting to a point substantially axially in line with the outermost periphery of said grinding wheel to limit the contact of said wheel with said surface, and means, connected with the wheel, including said tube to bodily move the wheel around said surface.

3. An inner cylindrical surface grinder comprising a tubular housing, a tube concentric with and rotatable therein, a driven shaft extending axially in said tube, a rotary grinding wheel pivoted on an axis parallel to the shaft to swing bodily on the outside of said tube and outwardly from the tubular housing, means connecting with said wheel and said shaft to drive said wheel from said shaft, elongated shoes connected to and extending longitudinally of said tubular housing a substantial portion of the length thereof and means operatively connected to one of said shoes to expand it outwardly against the cylindrical surface to mount said housing with the grinding wheel axis and the axes of pivotal movement parallel with respect to the cylindrical surface to be ground, means fixedly attached to the tube coacting with the housing to prevent relative longitudinal movement between the tube and housing, means connected to said tube and grinding wheel to move said grinding wheel outwardly from said housing into contact with the cylindrical surface and means connected with the grinding wheel including said tube to move said grinding wheel around said housing while in contact with the surface.

4. An inner cylindrical surface grinder comprising a tubular housing, a tube concentric with and rotatable therein, a wheel housing pivoted on an axis parallel to the shaft to swing bodily on the outside of said tube and outwardly from the tubular housing, said wheel housing having a rotary grinding wheel mounted thereon, means carried by said tubular housing and connected with said wheel to drive said wheel, elongated shoes connected to and extending longitudinally of said tubular housing a substantial portion of the length thereof and means operatively connected to one of said shoes to expand it outwardly against the cylindrical surface to mount said tubular housing with the grinding wheel axis and the axes of pivotal movement parallel with respect to the cylindrical surface to be ground, resilient means connected to and mounting one of said shoes on said tubular housing mounting means to compensate for non-parallelism in the cylindrical wall, means connected to said tube and wheel housing to urge said grinding wheel outwardly from said tubular housing into contact with the cylindrical surface, means connected with the grinding wheel including said tube, to move said grinding wheel around said tubular housing while in contact with the surface and a gauge on said wheel housing projecting therefrom to limit the contact of said wheel with said surface.

5. An inner cylindrical surface grinder comprising a tubular housing, a tube concentric with and rotatable therein, a driven shaft extending axially in said tube, a rotary grinding wheel pivoted on an axis parallel to the shaft to swing bodily on the outside of said tube and outwardly from the tubular housing, means connecting with said wheel and said shaft to drive said wheel from said shaft, means carried by said tubular housing to mount said housing with the grinding wheel axis and the axes of pivotal movement parallel with respect to a cylindrical surface to be ground, a spring connected to said tube and grinding wheel to continuously urge said grinding wheel outwardly from said housing into contact with the cylindrical surface, while grinding, means connected with said grinding wheel, including said tube to move said grinding wheel around said housing while in contact with the surface and a hand rod mounted upon and extending longitudinally of the tubular housing and extending outside the cylindrical surface, said rod connecting at one end with the grinding wheel to retract said grinding wheel inwardly toward said housing while the housing remains in its mounted relation with the surface and against the action of said spring.

6. An inner cylindrical surface step grinder comprising a tubular housing, a tube concentric with and rotatable therein and projecting from each end thereof, a driven shaft extending axially in said tube, a bracket attached to said tube and extending outwardly therefrom beneath and abutting said housing, a rotary wheel housing pivoted on said bracket on an axis parallel with said shaft to swing bodily on the outside of said tube and outwardly from the tubular housing, a rotary grinding wheel mounted in said wheel housing, a collar fixedly attached to the tube above and abutting the tubular housing cooperating with the bracket to prevent relative longitudinal movement between the tube and tubular housing in both directions, means driven from said shaft to rotate said grinding wheel on its axis, means carried by said tubular housing to mount said tubular housing axially within a cylindrical surface, with the wheel radial of the step, means connected to said tube and bracket to continuously urge the grinding wheel outwardly from the tubular housing and into contact with the surface step and means connected with the wheel, including said tube, to bodily move the wheel around the step.

7. An inner cylindrical surface grinder comprising a tubular housing, a tube concentric with and rotatable therein, means carried by said tubular housing to mount said housing axially within a cylindrical surface to be ground, a bracket on said tube and extending outwardly therefrom beneath and abutting said tubular housing, a wheel housing pivoted on an axis parallel with said tube to swing bodily on said bracket outwardly from the tubular housing, the wheel housing having an arcuate opening adjacent the tube concentric with its pivoted mounting on the bracket, a driven shaft in the tube passing through said opening into the wheel housing, a rotary grinding wheel on said wheel housing, the periphery of the wheel extending beyond the wheel housing on one side thereof, driving connections in said wheel housing between said grinding wheel and said shaft, means connected with said tube and wheel housing to continuously urge the grinding wheel outwardly from the tubular housing and into contact with the surface and a projection on said wheel housing in the area where the wheel projects beyond the wheel housing and adjacent the wheel to limit the contact of said wheel with the surface and a wheel attached to said tube at the end opposite said grinding wheel to bodily move the grinding wheel around the surface.

8. An inner cylindrical surface grinder comprising a tubular housing, a tube concentric with and rotatable therein, a driven shaft extending axially in said tube, means carried by said tubular housing to mount said housing axially within a cylindrical surface, means fixedly attached to the tube coacting with the housing to prevent relative longitudinal movement between the tube and housing, a wheel housing pivoted on an axis parallel with said shaft to swing bodily on the outside of said tube outwardly from the tubular housing, and freely around said tubular housing, the wheel housing having an arcuate opening adjacent the tube concentric with its pivotal mounting, the driven shaft extending through said opening into the wheel housing, a rotary grinding wheel mounted on the wheel housing, driving connections between the shaft and said grinding wheel, a wheel attached to said tube at the end opposite said grinding wheel to rotate the grinding wheel bodily about said tubular housing, the two axes of rotation being parallel, and resilient means connected to said tube and grinding wheel housing to continuously urge the grinding wheel outwardly from the tubular housing into resilient contact with the surface to be ground.

9. An inner cylindrical surface grinder comprising a tubular housing, a tube concentric with and rotatable therein, means carried by said tubular housing to mount said housing axially within a cylindrical surface, a wheel housing pivoted on an axis parallel with the tube to swing bodily on the outside of said tube outwardly from the tubular housing, the wheel housing an arcuate opening adjacent the tube concentric with its pivotal mounting, a driven shaft in the tube passing through said opening into the wheel housing, a rotary grinding wheel mounted on said wheel housing the periphery of the wheel extending beyond the wheel housing on one side thereof, driving connections between said shaft and said grinding wheel, in said wheel housing, and means connected with the grinding wheel, including said tube, to rotate the grinding wheel bodily about said tubular housing, the two axes of rotation being parallel, resilient means to continuously urge the grinding wheel outwardly from the tubular housing and a gauge on said wheel housing axially spaced from and adjacent said wheel in the area where the wheel projects beyond the wheel housing, to limit the outward movement of said grinding wheel.

10. A grinder for grinding the inside of cylindrical surfaces comprising, a tubular housing, means carried by said housing to secure the housing axially of the surface to be ground, a tube concentric with and rotatable in said housing and projecting from both ends thereof, means fixedly attached to one end of said tube to rotate the tube with respect to the housing, means fixedly attached to the tube coacting with the housing to prevent relative longitudinal movement between the tube and housing, a pivot mounted off center on the other end of said tube with its axis parallel to the tube axis, a stub shaft, a rotary grinding wheel thereon, means carried by said pivot mounting said stub shaft to swing bodily about the pivot on an axis parallel to the axis of the pivot, a drive shaft, driving connections between said stub shaft and said drive shaft, and resilient means connecting the tube and said mounting means to constrain the mounting means to urge the grinding wheel outwardly from the tubular housing, and resiliently into contact with the surface to be ground, and rod means on the tubular housing, interengaging with the stub shaft mounting means, to move the mounting means inwardly, axially of the tubular housing, against the resistance of the resilient means.

11. A grinder for grinding the inside of cylindrical surfaces comprising, a tubular housing, means carried by said housing to secure the housing axially of the surface to be ground, a tube concentric with and rotatable in said housing and projecting from both ends thereof, means on one end of said tube to rotate the tube with respect to the housing, a pivot mounted off center on the other end of said tube with its axis parallel to the tube axis, a stub shaft, a rotary grinding wheel thereon, means carried by said pivot mounting said stub shaft to swing bodily about the pivot on an axis parallel to the axis of the pivot, the periphery of the wheel extending beyond the stub shaft mounting means on one side thereof, a drive shaft, driving connections between said stub shaft and said drive shaft, means connecting the tube and said stub shaft mounting means to constrain the stub shaft mounting means to urge the grinding wheel outwardly from the tubular housing and into contact with the surface to be ground and means on said stub shaft mounting means spaced axially from the wheel in the area where the wheel projects beyond the stub shaft mounting means and projecting to a point substantially axially in line with the radially outermost grinding surface of the grinding wheel to oppose the constraining means to limit the contact of said wheel with the surface.

12. A grinder for grinding the inside of cylindrical surfaces comprising, a tubular housing, means carried by said housing to secure the housing axially of the surface to be ground, a tube concentric with and rotatable in said housing and projecting from both ends thereof, means on one end of said tube to rotate the tube with respect to the housing, a pivot mounted off center on the other end of said tube with its axis parallel to the tube axis, a stub shaft, a rotary grinding wheel thereon, means carried by said pivot mounting said stub shaft to swing bodily about the pivot on an axis parallel to the axis of the pivot, the periphery of the wheel extending beyond the stub shaft mounting means on one side thereof, a drive shaft, driving connections between said stub shaft and said drive shaft, and means connecting the tube and said stub shaft mounting means to constrain the stub shaft mounting means to urge the grinding wheel outwardly from the tubular housing and into contact with the surface to be ground and means on and projecting from said stub shaft mounting means spaced axially from the wheel in the area where the wheel projects beyond the stub shaft mounting means, adjacent the radially outermost grinding surface of the grinding wheel, to contact the surface adjacent that under the wheel, to oppose the constraining means and to limit the contact of the wheel with the portion then to be ground.

13. An inner cylindrical surface step grinder comprising a drive shaft mounting having a drive shaft therein, a pivot mounted off center of and parallel to said drive shaft on said mounting, a stub shaft, a rotary grinding wheel thereon, means connected by said pivot with said drive shaft mounting, mounting said stub shaft to swing bodily on said pivot on an axis parallel to the pivot, the stub shaft mounting means swinging freely about said pivot, the periphery of the wheel extending beyond the stub shaft mounting means on one side thereof, driving connections between said stub shaft and the drive shaft, and a spring connecting with said drive shaft mounting and said stub shaft mounting means to move said stub shaft mounting means to urge the grinding wheel outwardly from the drive shaft mounting resiliently into contact with the surface to be ground and an adjustable gauge, spaced axially from the grinding wheel in the stub shaft mounting means in the area where the wheel projects beyond the stub shaft mounting means, in position to engage the cylindrical surface to one side of the step when the grinding wheel has removed the step.

14. An inner cylindrical surface grinder comprising a drive shaft mounting having a drive shaft therein, a pivot mounted off center of and parallel to said drive shaft on said mounting, a stub shaft, a rotary grinding wheel thereon, means connected by said pivot with said drive shaft mounting, mounting said stub shaft to swing bodily on said pivot on an axis parallel to the pivot axis, the periphery of the wheel extending beyond the stub shaft mounting means on one side thereof, driving connections between said stub shaft and the drive shaft, means connecting said drive shaft mounting and said stub shaft mounting means to move said stub shaft mounting means to urge the grinding wheel outwardly from the drive shaft mounting and into contact with the surface to be ground and means spaced axially from but adjacent said wheel on said stub shaft mounting means in the area where the wheel projects beyond the stub shaft mounting means, projecting outwardly beyond said stub shaft mounting means to contact the surface adjacent that under the wheel, to limit the contact of the wheel with the portion of the surface then to be ground.

15. An inner cylindrical surface grinder comprising a drive shaft mounting having a drive shaft therein, a pivot mounted off center of and parallel to said drive shaft on said mounting to rotate therearound, a stub shaft, a rotary grinding wheel thereon, means carried by said pivot mounting said stub shaft to swing bodily on said pivot on an axis parallel to the pivot, driving connections between said stub shaft and the drive shaft, the stub shaft mounting means swinging freely about said pivot, spring means connecting with said drive shaft mounting and said stub shaft mounting means to move said stub shaft mounting means to urge the grinding wheel outwardly from the drive shaft mounting, means attached to said drive shaft mounting to turn the pivot and stub shaft mounting means bodily around the drive shaft mounting and rod means on the drive shaft mounting interengaging with the stub shaft mounting means to move the stub shaft mounting means inwardly, axially of the drive shaft, against the resistance of the spring means.

16. An inner cylindrical surface grinder comprising a drive shaft mounting having a drive shaft therein, a pivot mounted off center of and parallel to said drive shaft on said mounting to rotate therearound, a stub shaft, a rotary grinding wheel thereon, means carried by said pivot mounting said stub shaft to swing bodily on said pivot on an axis parallel to the pivot, the periphery of the wheel extending beyond the stub shaft mounting means on one side thereof, driving connections between said stub shaft and the drive shaft, means carried by said drive shaft mounting to turn the pivot and mounting means bodily around the drive shaft mounting, means connecting with said stub shaft mounting means and said turning means to move said stub shaft mounting means to urge the grinding wheel outwardly from the drive shaft mounting and into contact with the surface to be ground and a gauge on said stub shaft mounting means adjacent said wheel, and spaced axially from the wheel in the area where the wheel projects beyond the stub shaft mounting means to limit the contact of said wheel with the surface.

17. An inner cylindrical surface grinder comprising a drive shaft mounting having a drive shaft therein, a pivot mounted off center of and parallel to said drive shaft on said mounting to rotate therearound, a stub shaft, a rotary grinding wheel thereon, means carried by said pivot mounting said stub shaft to swing bodily on said pivot on an axis parallel to the pivot, the periphery of the wheel extending beyond the stub shaft mounting means on one side thereof, driving connections between said stub shaft and the drive shaft, resilient means connected to said stub shaft mounting means and said drive shaft mounting to move said stub shaft mounting means to urge the grinding wheel outwardly from the drive shaft mounting and resiliently into contact with the surface to be ground and a projection on said stub shaft mounting means, spaced axially from but adjacent said wheel in the area where the wheel projects beyond the stub shaft mounting means, to contact the surface adjacent that under the wheel, to oppose the resilient means and to limit the contact of the wheel with the portion then to be ground, said stub shaft mounting means having an abutment thereon, a rod turnably mounted on said drive shaft mounting having a handle at one end, and an offset portion on the other end adapted to contact said abutment and turn the stub shaft mounting means inwardly toward the drive shaft to remove the wheel from the cylindrical surface.

CY RAYMOND MERRILL.

REFERENCES CITED

The following references are of record in the file of this patent:

UNITED STATES PATENTS

| Number | Name | Date |
|---|---|---|
| 259,727 | Smith | June 20, 1882 |
| 440,682 | Wood | Nov. 18, 1890 |
| 602,213 | Dyer | Apr. 12, 1898 |
| 1,132,196 | Lindner | Mar. 16, 1915 |
| 1,399,213 | Johnson | Dec. 6, 1921 |
| 1,708,798 | Nelson | Apr. 9, 1929 |
| 2,302,141 | Perry | Nov. 17, 1942 |
| 2,403,363 | Hanson | July 2, 1946 |

FOREIGN PATENTS

| Number | Country | Date |
|---|---|---|
| 374,579 | Great Britain | June 16, 1932 |